(12) United States Patent
Yang et al.

(10) Patent No.: US 10,219,156 B2
(45) Date of Patent: Feb. 26, 2019

(54) APPARATUS AND METHOD FOR PROTECTING DATA IN FLASH MEMORY BASED ON UNAUTHORIZED ACTIVITY ON SMART DEVICE

(71) Applicant: Electronics and Telecommunications Research Institute, Daejeon (KR)

(72) Inventors: Seung-Jei Yang, Daejeon (KR); Jung-Ho Choi, Daejeon (KR); Ki-Bom Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 75 days.

(21) Appl. No.: 15/069,136

(22) Filed: Mar. 14, 2016

(65) Prior Publication Data

US 2017/0118649 A1    Apr. 27, 2017

(30) Foreign Application Priority Data

Oct. 23, 2015    (KR) .................. 10-2015-0147829

(51) Int. Cl.
*H04W 12/08*    (2009.01)
*H04L 29/06*    (2006.01)
*H04W 88/02*    (2009.01)

(52) U.S. Cl.
CPC ............. *H04W 12/08* (2013.01); *H04L 63/10* (2013.01); *H04W 88/02* (2013.01)

(58) Field of Classification Search
CPC ...... H04L 63/10; H04W 12/08; H04W 88/02; H04W 12/06; H04W 12/10; H04W 12/12
See application file for complete search history.

(56) References Cited

U.S. PATENT DOCUMENTS

| 5,511,184 A | 4/1996 | Lin |
| 5,802,277 A | 9/1998 | Cowlard |
| 2004/0006689 A1 | 1/2004 | Miller et al. |
| 2007/0067835 A1 | 3/2007 | Koistinen et al. |
| 2008/0270652 A1* | 10/2008 | Jeansonne ............... G06F 21/53 710/108 |
| 2009/0292950 A1* | 11/2009 | Tsai .................... G06F 11/2284 714/36 |
| 2010/0083386 A1* | 4/2010 | Kline ..................... G06F 21/33 726/34 |

(Continued)

FOREIGN PATENT DOCUMENTS

| JP | 06-348486 A | 12/1994 |
| JP | 11506856 A | 6/1999 |

(Continued)

*Primary Examiner* — Dinh Nguyen
(74) *Attorney, Agent, or Firm* — Nelson Mullins Riley & Scarborough LLP; Anthony A. Laurentano (57) ABSTRACT

Disclosed herein are a data protection apparatus and method for a smart device. The data protection apparatus for a smart device includes a detection unit for detecting unauthorized activity in a bootloader of the smart device, based on whether a program for acquiring an administrator privilege has been installed and whether a compressed-command file is present, during a procedure for loading the bootloader, and a data access blocking unit for, when the unauthorized activity is detected, performing an operation of locking the smart device, thus blocking access to data in the smart device.

6 Claims, 10 Drawing Sheets (56) References Cited

U.S. PATENT DOCUMENTS

| | | | |
|---|---|---|---|
| 2012/0210115 A1* | 8/2012 | Park | H04L 9/3242 |
| | | | 713/2 |
| 2015/0039876 A1* | 2/2015 | Baratam | G06F 9/4401 |
| | | | 713/2 |
| 2015/0040224 A1* | 2/2015 | Litva | G06F 21/554 |
| | | | 726/23 |
| 2015/0094023 A1* | 4/2015 | Abramson | H04W 12/06 |
| | | | 455/411 |
| 2015/0149757 A1 | 5/2015 | Brown et al. | |
| 2015/0149759 A1* | 5/2015 | Tsuji | G06F 9/441 |
| | | | 713/2 |

FOREIGN PATENT DOCUMENTS

| | | |
|---|---|---|
| JP | 2012-114699 A | 6/2012 |
| KR | 10-2004-0025727 A | 3/2004 |
| KR | 10-2014-0144070 A | 12/2014 |
| KR | 2015-0018155 A | 2/2015 |

\* cited by examiner

FIG. 1

```
C:\adb>adb shell
* daemon not running. starting it now on port 5037 *
* daemon started successfully *
shell@tbelteskt:/ $ su
su
/system/bin/sh: su: not found
127 shell@tbelteskt:/ $
```

FIG. 2

```
C:\adb>adb shell
shell@android:/ $ ls -1 /system/xbin
ls -1 /system/xbin
-rwxr-xr-x root    root    shell    59760 2013-09-22 07:23 dexdump
-rwsr-sr-s root    root    root     91980 2008-08-01 12:00 su
shell@android:/ $ su
su
shell@android:/ #
```

APPARATUS AND METHOD FOR PROTECTING DATA IN FLASH MEMORY BASED ON UNAUTHORIZED ACTIVITY ON SMART DEVICE

CROSS REFERENCE TO RELATED APPLICATION

This application claims the benefit of Korean Patent Application No. 10-2015-0147829, filed Oct. 23, 2015, which is hereby incorporated by reference in its entirety into this application.

BACKGROUND OF THE INVENTION

1. Technical Field

The present invention generally relates to a method for protecting data stored in the flash memory of a smart device and, more particularly, to a method and apparatus that protect data stored in flash memory by activating the locked state of access to a smart device at a bootloader step, and prevent illegal use of the smart device from occurring due to the loss or theft of the smart device.

2. Description of the Related Art

Recently, with the advent of various smart devices, the improvement of the speed of a Central Processing Unit (CPU) and memory for an embedded system, and the increase in the storage space of the CPU and memory thereof, technologies that can also be used for work have appeared. Compared to a personal computer (PC), smart devices may be easily lost or stolen by another person due to the portability thereof. Therefore, since confidential information related to work, as well as personal information, is stored in a smart device, problems such as information leakage may occur when the smart device is lost or stolen by another person. To protect information against such information leakage, methods for setting the control of user access using a password or the like and kill switch functions, capable of remotely locking a smart device or deleting data, have been provided.

The methods for setting the control user access to smart devices are intended to set access control so that only authorized users are capable of accessing smart devices using various methods such as pattern-lock, user password input, fingerprint recognition, and knock-on. However, such methods are problematic in that when access control is bypassed by another person using forensic acquisition technology, data stored in flash memory may be acquired.

Remote control methods correspond to kill switch methods for remotely setting the locking device of smart devices or remotely initializing data when the smart device is lost. Such a remote control function is installed on and utilized in recent smart devices. Kill switch functions are intended to remotely operate a locking device or remotely perform a factory reset function using a Short Message Service (SMS) push message based on menu preset by the user when a smart device is lost. However, such a kill switch function is problematic in that smart devices can be remotely operated only in an environment in which they are connected to a mobile communication network or a Wi-Fi network. When a smart device is lost or stolen, it is impossible to perform a kill switch function if another person removes a Universal Subscriber Identity Module (USIM) card from the corresponding smart device or if the smart device is in an airplane mode or is located in a shielded space in which signals are blocked. Thus, there is a problem in that personal information and confidential data for work, stored in the smart device, are inevitably leaked by another person. Further, kill switch functions based on remote deletion are also problematic in that user data can be recovered using forensic recovery tools, even after factory reset.

Therefore, there are required technologies and devices that are capable of protecting personal information and confidential information for work, stored in smart devices, when the smart devices are lost or stolen by other persons.

SUMMARY OF THE INVENTION

Accordingly, the present invention has been made keeping in mind the above problems occurring in the prior art, and an object of the present invention is to protect the data stored in the flash memory of a smart device when the smart device is lost or is stolen by another person.

Another object of the present invention is to protect the data stored in the flash memory of a smart device with which communication is interrupted.

A further object of the present invention is to protect the data stored in the flash memory of a smart device from a forensic data collection device.

In accordance with an aspect of the present invention to accomplish the above objects, there is provided a data protection apparatus for a smart device, including a detection unit for detecting unauthorized activity in a bootloader of the smart device, based on whether a program for acquiring an administrator privilege has been installed and whether a compressed-command file is present, during a procedure for loading the bootloader; and a data access blocking unit for, when the unauthorized activity is detected, performing an operation of locking the smart device, thus blocking access to data in the smart device.

The detection unit may perform a task for detecting the unauthorized activity before any one of a boot image and a recovery image present in the smart device is uploaded to memory.

The detection unit may detect the unauthorized activity based on whether an original kernel present in the boot image or the recovery image has been replaced with a custom kernel.

The detection unit may detect the unauthorized activity based on a result of comparing a hash value of the original kernel with a hash value of the custom kernel.

The detection unit may detect the unauthorized activity whenever the smart device is booted.

The data access blocking unit may activate lock parameters of the smart device and switch the smart device to a locked state based on values of the lock parameters when the unauthorized activity is present.

The data access blocking unit may switch modules other than a Universal Serial Bus (USB) module and the bootloader of the smart device to a deactivated state when the smart device is in the locked state.

The data protection apparatus may further include a data access unblocking unit for releasing the locked state of the smart device, and permitting access to the data.

The data access unblocking unit may establish a connection between the smart device and a computer using the USB module, and the computer may release the locked state based on data received from an unlocking server.

When the locked state is released, the program for acquiring the administrator privilege and the custom kernel may be deleted using a firmware update program.

In accordance with another aspect of the present invention to accomplish the above objects, there is provided a data protection method for a smart device, including detecting unauthorized activity in a bootloader of the smart device, based on whether a program for acquiring an administrator privilege has been installed and whether a file in which commands are compressed is present, during a procedure for loading the bootloader; and when the unauthorized activity is detected, performing an operation of locking the smart device and blocking access to data in the smart device.

Detecting the unauthorized activity may be configured to detect the unauthorized activity before any one of a boot image and a recovery image present in the smart device is uploaded to memory.

Detecting the unauthorized activity may be configured to detect the unauthorized activity based on whether an original kernel present in the boot image or the recovery image has been replaced with a custom kernel.

Detecting the unauthorized activity may be configured to detect the unauthorized activity based on a result of comparing a hash value of the original kernel with a hash value of the custom kernel.

Detecting the unauthorized activity may be configured to detect the unauthorized activity whenever the smart device is booted.

Blocking access to the data in the smart device may be configured to change values of respective lock parameters of the smart device and switch the smart device to a locked state based on the lock parameters when the unauthorized activity is present.

Blocking access to the data in the smart device may be configured to switch modules other than a Universal Serial Bus (USB) module and the bootloader of the smart device to a deactivated state when the smart device is in the locked state.

The data protection method may further include releasing the locked state of the smart device.

Releasing the locked state may be configured to establish a connection between the smart device and a computer using the USB module, and allow the computer to release the locked state based on data received from an unlocking server.

Releasing the locked state may be configured to delete the program for acquiring the administrator privilege and the custom kernel using a firmware update program when the locked state is released.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
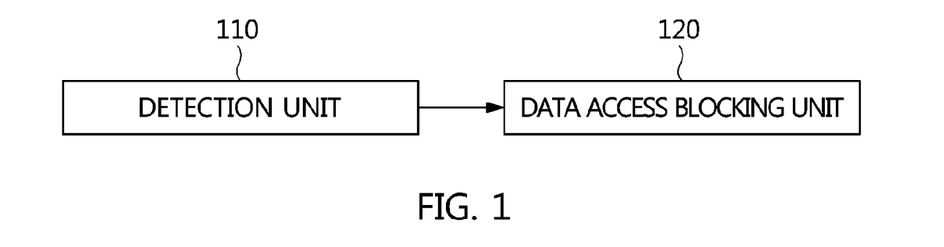
FIG. 1 is a block diagram showing a data protection apparatus for a smart device according to an embodiment of the present invention.

FIG. 1 is a block diagram showing a data protection apparatus for a smart device according to an embodiment of the present invention.

Referring to FIG. 1, the data protection apparatus for a smart device according to an embodiment of the present invention includes a detection unit 110 and a data access blocking unit 120.

The detection unit 110 may detect unauthorized activity occurring in the bootloader of the smart device, based on whether a program for acquiring administrator privileges has been installed and whether a compressed-command file is present, during a procedure in which the bootloader is loaded.

First, the data in the smart device is stored in flash memory contained in the smart device. In the case of the flash memory, the data stored therein is protected using a sandboxing or permission technique or the like.

Here, in order for a third party to access the data stored in the flash memory, administrator privileges must be acquired. This procedure is called rooting. Typically, administrator privileges are referred to as "Superuser: SU". As a representative of programs for acquiring administrator privileges, there is a Superuser application.

Figure 2:
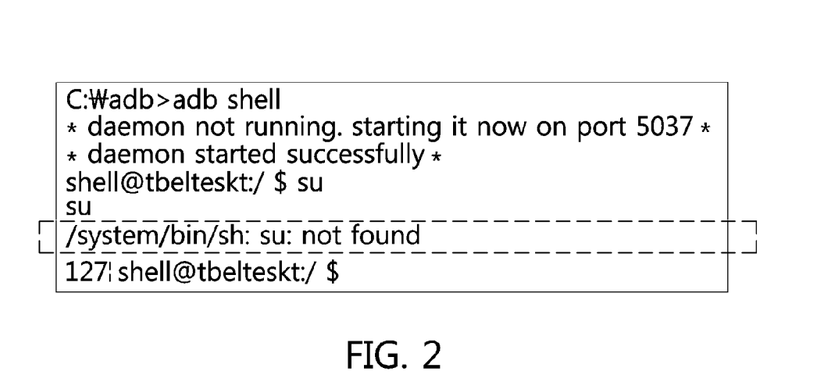
FIGS. 2 and 3 are diagrams showing a normal state and a state in which a program for acquiring administrator privileges is installed in the data protection apparatus for a smart device according to an embodiment of the present invention.

Referring to FIG. 2, the case where a program for acquiring administrator privileges has not been installed is illustrated.

Figure 3:
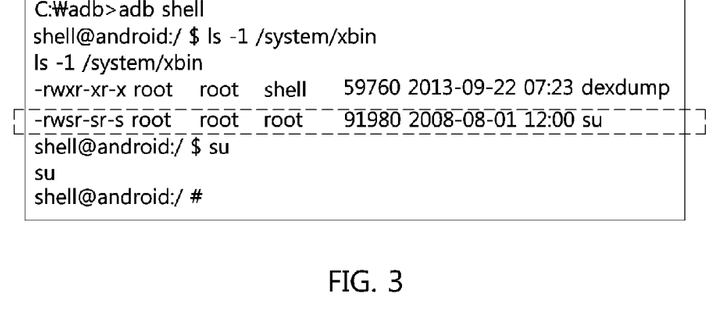

In FIG. 3, the case where a program for acquiring administrator privileges (ROOT) is installed is illustrated. Referring to FIG. 3, it can be seen that administrator privileges have been acquired.

Typically, if a program for acquiring administrator privileges has been installed, it is highly likely that it is intended to perform rooting and extract data, and thus the detection unit 110 may detect unauthorized activity in a bootloader based on whether a program for acquiring administrator privileges is present.

Further, a compressed-command file means a file in which commands used in a system, such as an Android system, are compressed. Typically, the Android system necessarily requires such a file for rooting. As such a compressed-command file, BusyBox has been widely used. That is, the present invention detects unauthorized activity in a bootloader based on whether a BusyBox (a compressed-command file) is present.

Furthermore, the detection unit 110 may detect unauthorized activity depending on whether an original kernel present in a boot image or a recovery image has been replaced with a custom kernel.

In typical cases, a smart device including a user access control function (including pattern-lock, password input, fingerprint recognition, etc.) enables a communication function when the smart device is connected to a PC only if user access control has been released. That is, when the user access control function is present, it is difficult for persons other than the authentic user, who knows the password or the like, to acquire data stored in the flash memory. However, if a normal kernel in the boot image or the recovery image is replaced with a custom kernel capable of accessing user data, and the custom kernel is flashed, and then booting is performed in a recovery mode, it is possible to access the data stored in the flash memory despite the user access control function.

Figure 4:
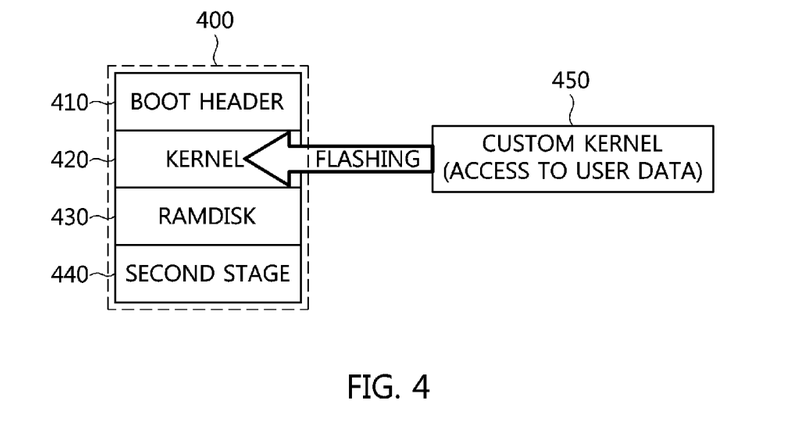
FIG. 4 is a diagram showing the installation of a custom kernel in a boot image or a recovery image in the data protection apparatus for a smart device according to an embodiment of the present invention.

Referring to FIG. 4, which shows a boot image/recovery image, it can be seen that a custom kernel 450 is inserted into a kernel 420 in a boot image 400. When the method shown in FIG. 4 is used, it is possible to access data stored in the flash memory despite a user access control function.

Therefore, when a custom kernel differing from a previously installed kernel is installed, this installation is determined to be unauthorized activity that enables access to the inside of the system, such as rooting.

Figure 5:
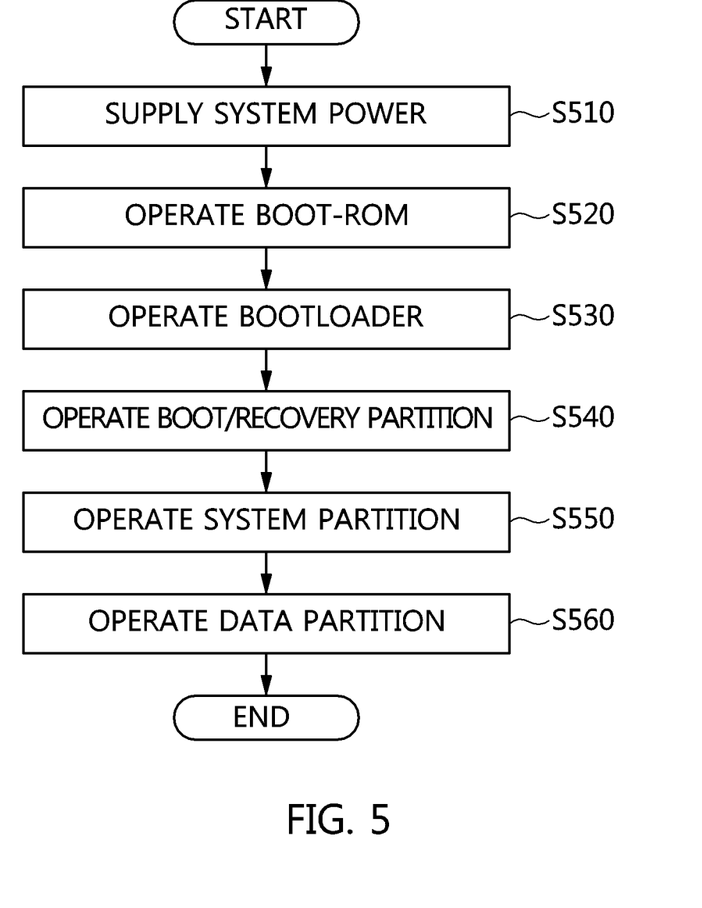
FIG. 5 is a flowchart showing the step at which the detection unit shown in FIG. 1 is operated at a smart device booting step.

In particular, the detection unit 110 detects unauthorized activity while a bootloader is executed during a booting procedure. Referring to FIG. 5, the typical booting sequence for a smart device is illustrated.

While system power is supplied to a smart device at step S510, boot-ROM is executed at step S520. As the bootloader is loaded into memory at step S530, a hardware initialization task is performed. Thereafter, as the boot image or the recovery image is uploaded to memory, the code in the kernel is executed at step S540. Thereafter, a system partition is mounted at step S550, and a data partition is also mounted at step S560.

Here, a root binary may be executed at step S550. Further, the step of uploading a custom kernel to the memory may be performed at step S540. That is, to protect the data stored in the flash memory, unauthorized activity must be detected before the root binary and the custom kernel are executed. Therefore, the detection unit 110 of the data protection apparatus for the smart device according to the embodiment of the present invention detects unauthorized activity at the bootloader operating step S530, which corresponds to the step before step S540, at which the kernel is executed.

Conventional technology that uses an access control method to protect data detects unauthorized activity after the bootloader has been executed. That is, after the kernel has been executed, an access control function is uploaded to the memory, and thus the above-described problem cannot be solved if a method for bypassing an access control function is used.

In contrast, the present invention may solve the problem with the conventional art because unauthorized activity may be detected at a bootloader execution step. Further, as will be described later, no operations except for an operation of unlocking the smart device can be performed at the bootloader step when the smart device is in a locked state, thus enabling the conventional problem to be solved.

That is, the detection unit 110 may detect unauthorized activity before any one of a boot image and a recovery image, present in the smart device, is uploaded to the memory.

In particular, in order to detect whether a custom kernel has been applied, the detection unit 110 compares the hash value of a preset original kernel with the hash value of the kernel used for booting, and determines that a custom kernel has been flashed if the hash values do not match each other, thus enabling unauthorized activity to be detected.

Here, hash values may be variously configured and applied according to a hash algorithm, such as Message Digest Algorithm 5 (MD5), Secure Hash Algorithm 1 (SHA1), SHA256, or SHA512.

Further, the detection unit 110 may also detect unauthorized activity whenever the smart device is booted.

The data access blocking unit 120 performs an operation of locking the smart device when unauthorized activity is detected, and blocks access to the data in the smart device.

Figure 6:
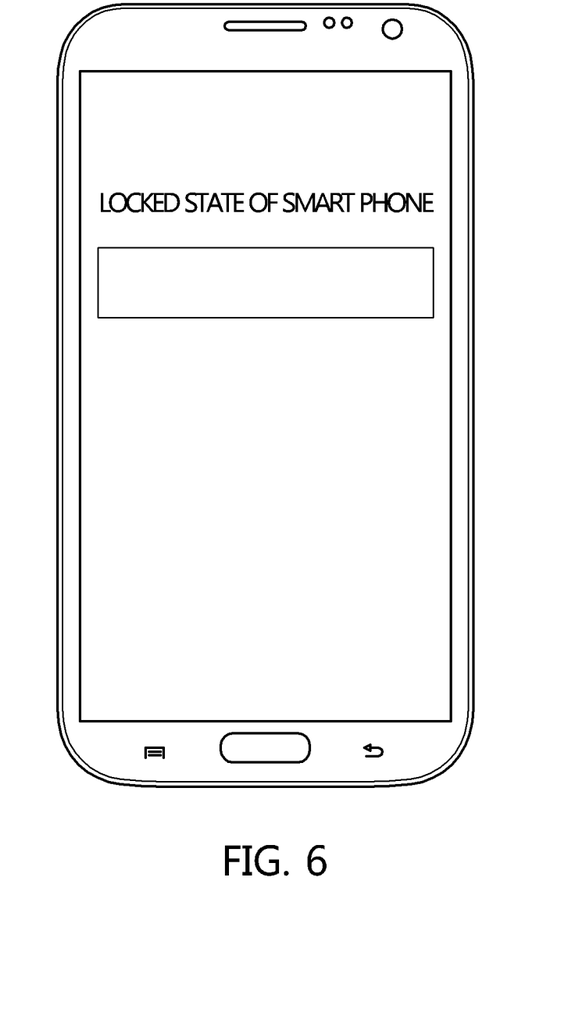
FIG. 6 is a diagram showing the state in which the smart device switches to a locked state in the data protection apparatus for a smart device according to an embodiment of the present invention.

FIG. 6 is a diagram showing an embodiment in which the smart device switches to a locked state.

Here, when unauthorized activity is detected, the data access blocking unit 120 may change the values of lock state parameters of the smart device, and may switch the smart device to a locked state based on the values of the lock state parameters.

Here, 'locked state' denotes the state in which only modules that are only capable of responding to an unlock command are activated, and all other functions are switched to a deactivated state.

The modules that are activated in a locked state may include a bootloader module and a Universal Serial Bus (USB) module.

The modules that are switched to a deactivated state may include a module for installing new firmware in the bootloader. The reason for this is to prevent the bootloader from being replaced via a firmware update when the smart device is in a locked state. Therefore, when the present invention is used, the smart device may be configured such that, in the locked state, it does not respond to any operations except for an unlock operation.

Further, the data protection apparatus according to the present invention may include an unlocking unit (not shown) for releasing the locked state of the locked smart device.

Here, the locked state of the smart device may be released by inputting an unlock code.

Furthermore, the locked state may be released by connecting the smart device to a PC and then allowing the smart device to access an unlocking server.

The method for releasing the locked state will be described in detail with reference to FIGS. 11 and 12.

Also, the data protection apparatus for the smart device according to an embodiment of the present invention may delete both the program for acquiring administrator privileges and the custom kernel using a firmware update program when the locked state is released. That is, both the program for acquiring administrator privileges and the custom kernel may be deleted according to a method for newly installing a bootloader using the firmware update program.

Figure 7:
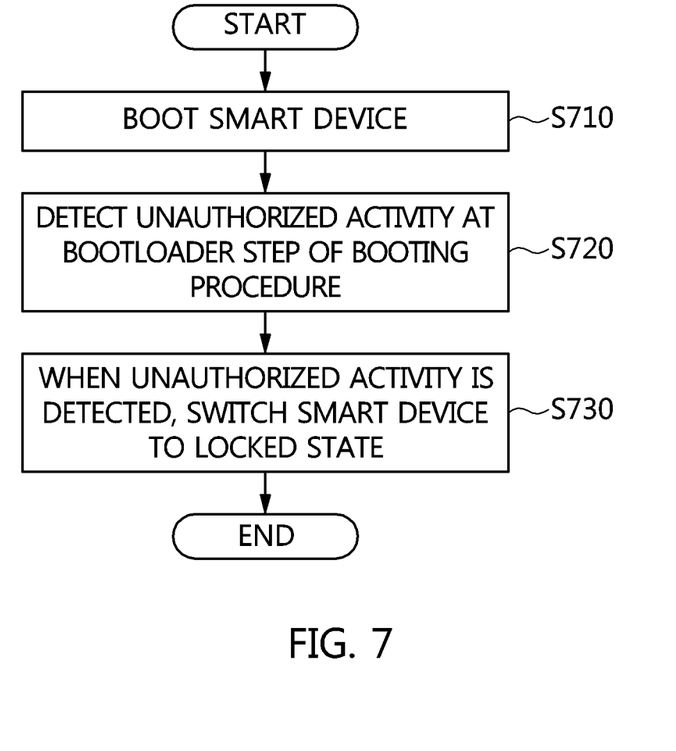
FIG. 7 is an operation flowchart showing a data protection method for a smart device according to an embodiment of the present invention.

FIG. 7 is an operation flowchart showing a data protection method for a smart device according to an embodiment of the present invention.

Referring to FIG. 7, the smart device is booted at step S710.

Further, the detection unit 110 detects unauthorized activity in a bootloader based on whether a program for acquiring administrator privileges has been installed and whether a compressed-command file is present, at the bootloader step of a booting procedure at step S720.

Typically, if a program for acquiring administrator privileges has been installed, it is highly likely that it is intended to perform rooting and extract data, and thus the detection unit 110 may detect unauthorized activity in a bootloader based on whether a program for acquiring administrator privileges is present.

Further, a compressed-command file means a file in which commands used in a system, such as an Android system, are compressed. Typically, the Android system necessarily requires such a file for rooting. As such a compressed-command file, BusyBox has been widely used. That is, the present invention detects unauthorized activity in a bootloader based on whether a BusyBox (a compressed-command file) is present.

Conventional technology that uses an access control method to protect data detects unauthorized activity after the bootloader has been executed. That is, after the kernel has been executed, an access control function is uploaded to the memory, and thus the above-described problem cannot be solved if a method for bypassing an access control function is used.

In contrast, the present invention may solve the conventional problem because unauthorized activity may be detected at a bootloader execution step. Further, as will be described later, no operations except for an operation of unlocking the smart device can be performed at the bootloader step when the smart device is in a locked state, thus enabling the conventional problem to be solved.

Further, when unauthorized activity is detected, the data access blocking unit 120 switches the smart device to a locked state at step S730.

Here, 'locked state' denotes the state in which only modules that are only capable of responding to an unlock command are activated, and all other functions are switched to a deactivated state.

The modules that are activated in a locked state may include a bootloader module and a Universal Serial Bus (USB) module.

The modules that are switched to a deactivated state may include a module for installing new firmware in the bootloader. The reason for this is to prevent the bootloader from being replaced via a firmware update in a locked state. Therefore, when the present invention is used, the smart device may be configured such that, in the locked state, it does not respond to any operations except for an unlock operation.

Although not shown in FIG. 7, the data protection method may further include the step of outputting a result indicating the locked state after step S730.

The result indicating the locked state may be output via the display of the smart device, for example, as shown in FIG. 6.

Figure 8:
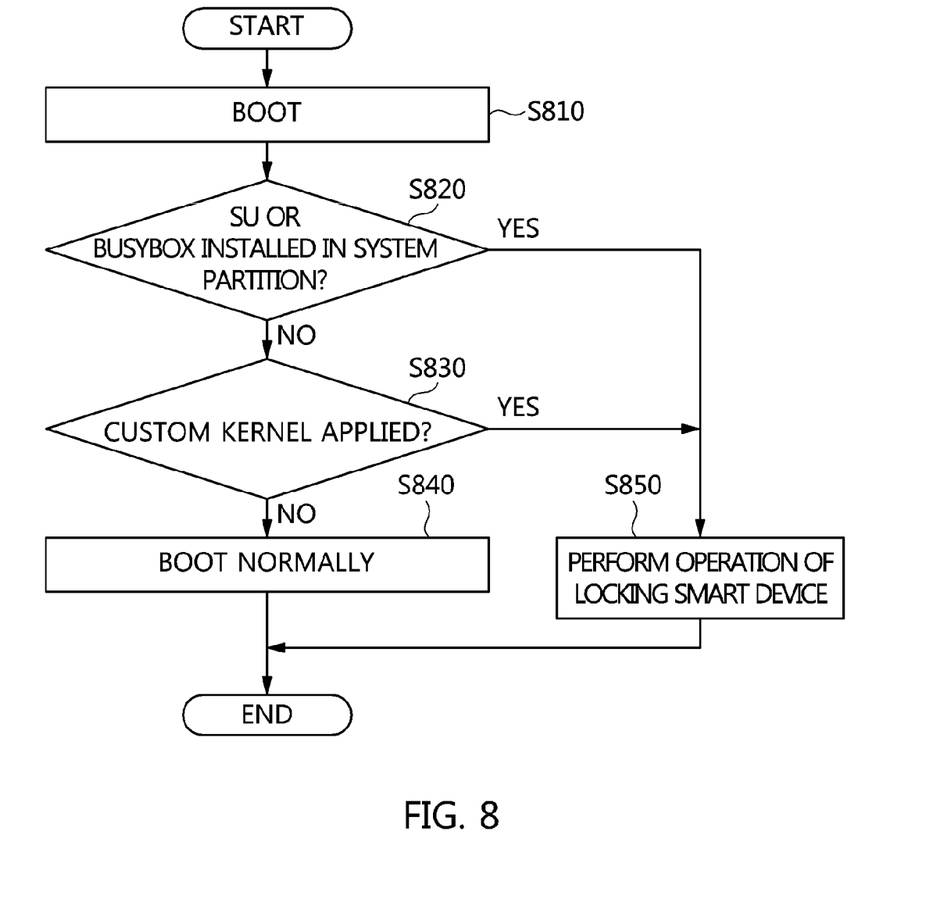
FIG. 8 is an operation flowchart showing a method for detecting unauthorized activity in the data protection method for a smart device according to an embodiment of the present invention.

FIG. 8 is an operation flowchart showing a method for detecting unauthorized activity in the data protection method for a smart device according to an embodiment of the present invention.

Referring to FIG. 8, the smart device is booted at step S810.

Further, it is determined whether a root binary, such as BusyBox or a program (Superuser: SU) for acquiring administrator privileges, has been installed in a system partition at step S820.

Here, if it is determined that the root binary has been installed, the smart device is switched to a locked state at step S850.

In contrast, if it is determined that a root binary has not been installed, whether a custom kernel has been applied is determined at step S830.

In this case, the hash value of the original kernel is compared with the hash value of the kernel used for booting. When the hash values do not match each other, it may be determined that the custom kernel has been applied.

Here, as a hash algorithm for calculating hash values, MD5, SHA1, SHA256, or SHA512 may be used.

If it is determined that the custom kernel has been applied, the smart device is switched to a locked state at step S850.

In contrast, if it is determined that a custom kernel has not been applied, the smart device is booted normally at step S840.

Figure 9:
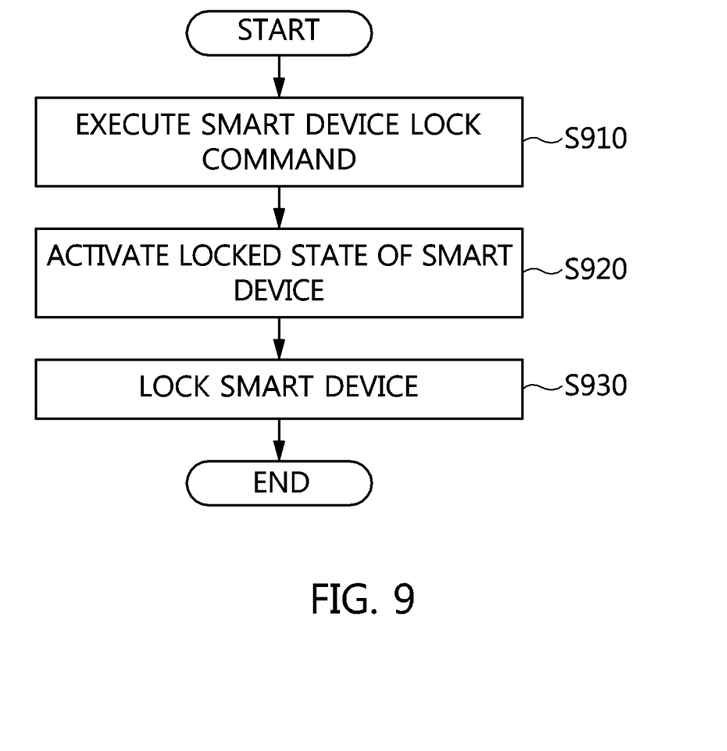
FIG. 9 is an operation flowchart showing a method for switching the smart device to a locked state in the data protection method for a smart device according to an embodiment of the present invention.

FIG. 9 is an operation flowchart showing a method for locking a smart device in the data protection method for a smart device according to an embodiment of the present invention.

Referring to FIG. 9, if it is determined that the root binary or the custom kernel has been installed, a smart device lock command is executed at step S910.

Here, after the values of the lock parameters of the smart device have been activated, the smart device may enter a locked state.

At this time, when the smart device is in a locked state, it may respond only to an unlock command. Further, remaining modules other than a module capable of responding only to the unlock command may be deactivated. The reason for this is that commands for installing new firmware in a bootloader may be present, and then the bootloader has the possibility of being replaced via a firmware update in response to the commands. Therefore, in order to exclude this possibility, all other functions are deactivated so that the smart device does not respond to any operations except for the unlock operation.

Further, the locked state of the smart device is activated at step S920, and then the smart device is switched to a locked state at step S930.

Figure 10:
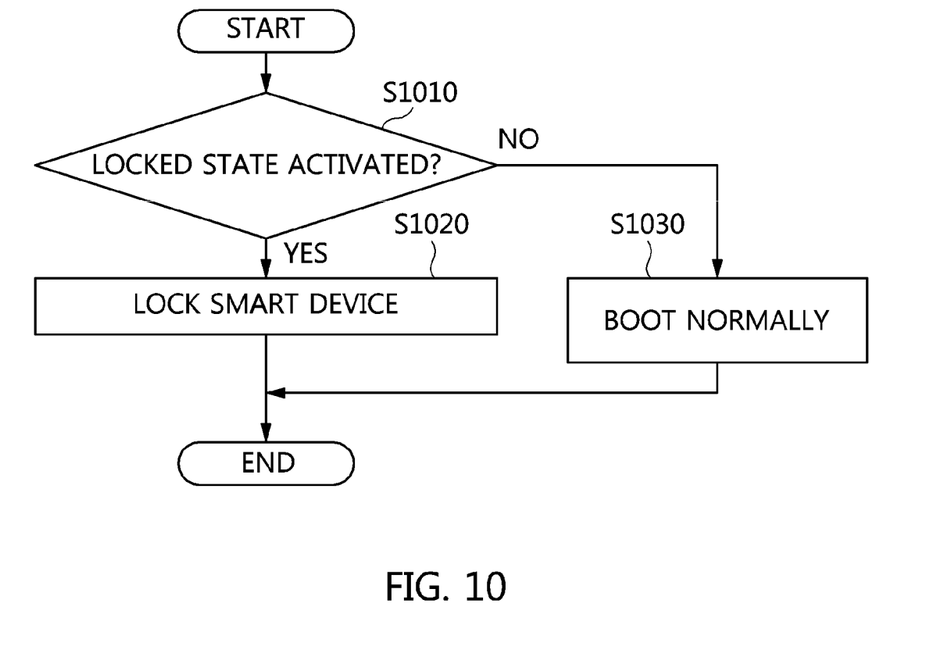
FIG. 10 is an operation flowchart showing a method for restarting a smart device depending on whether it is in a locked state in the data protection method for the smart device according to an embodiment of the present invention.

FIG. 10 is an operation flowchart showing a method for restarting a smart device depending on whether it is in a locked state in the data protection method for the smart device according to an embodiment of the present invention.

Referring to FIG. 10, it is determined whether the locked state of the smart device has been activated at step S1010.

If it is determined that the locked state has been activated, the smart device is maintained in the locked state at step S1020.

In contrast, if it is determined that the locked state has been deactivated, the smart device is booted normally at step S1030.

That is, FIG. 10 shows that, before the locked state is deactivated, data cannot be extracted no matter which operation is used. The reason for this is that data extraction can be performed after the bootloader has been executed, but the data protection method for the smart device according to the embodiment of the present invention performs data extraction at the bootloader execution step.

Figure 11:
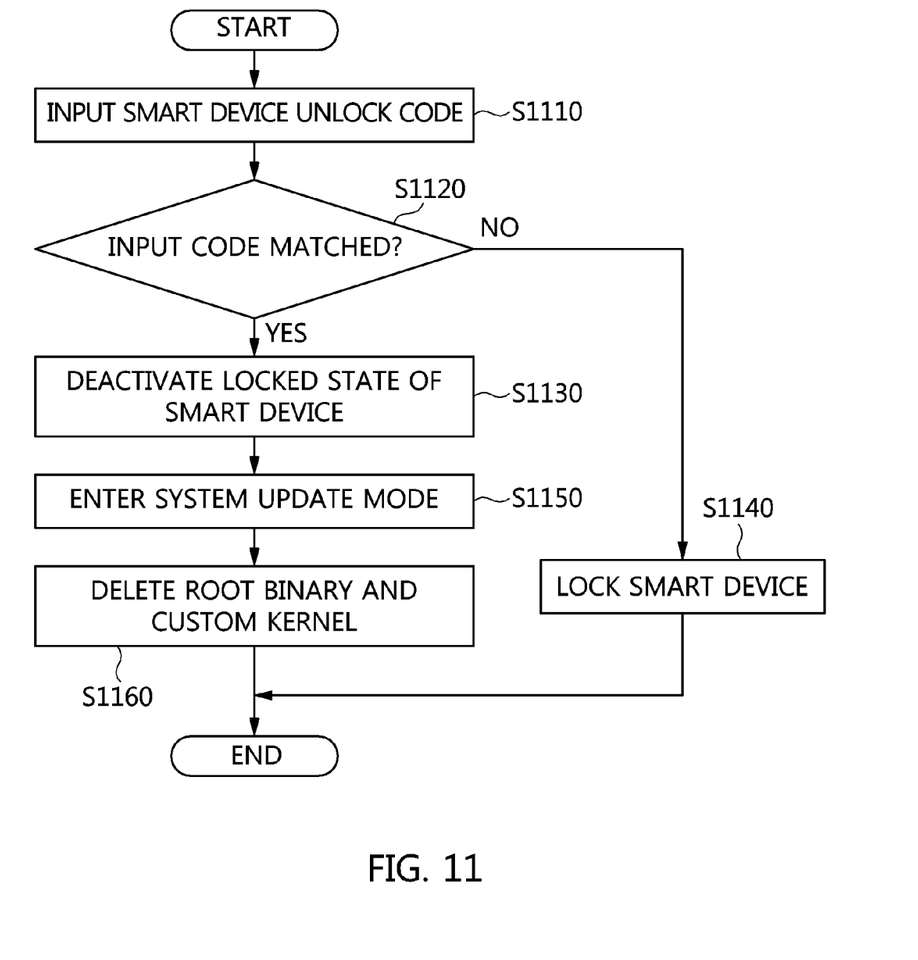
FIGS. 11 and 12 are operation flowcharts showing a method for releasing the locked state of the smart device in the data protection method for a smart device according to an embodiment of the present invention.
Figure 12:
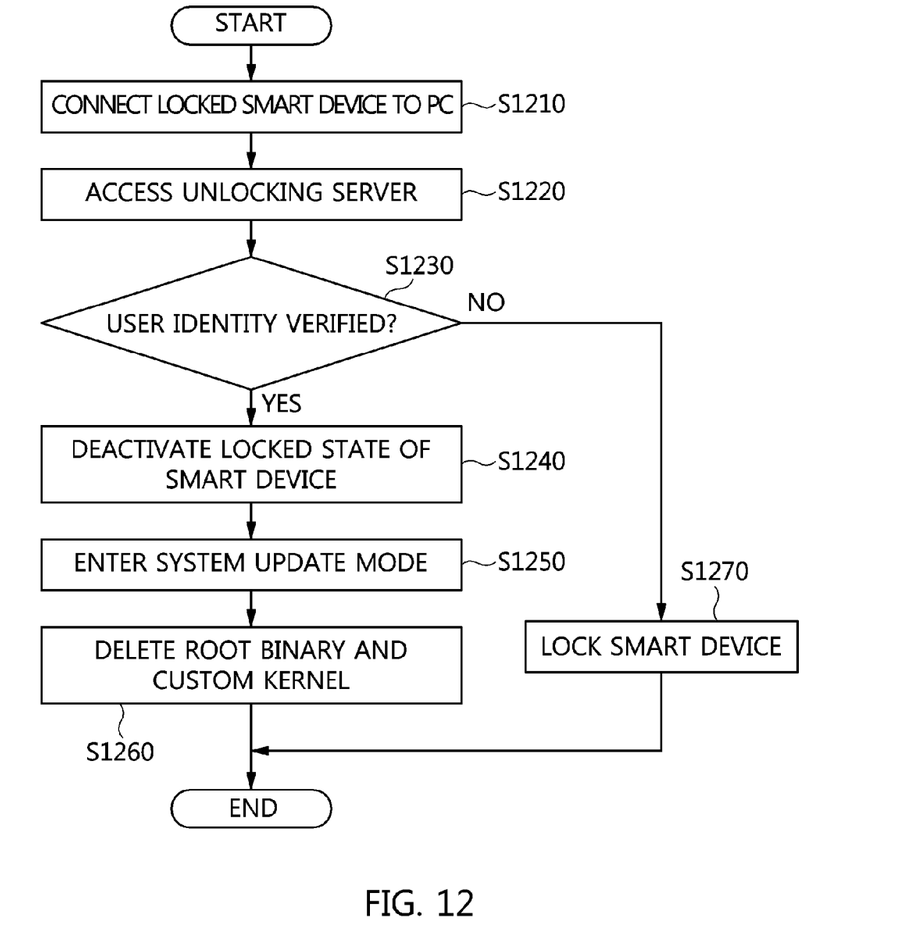

FIGS. 11 and 12 are operation flowcharts showing a method for unlocking a locked smart device in the data protection method for the smart device according to an embodiment of the present invention.

First, FIG. 11 illustrates a method for unlocking a locked smart device by directly inputting the unlock code of the smart device.

Referring to FIG. 11, the unlock code of the smart device is input at step S1110, and whether the input code matches a preset code is determined at step S1120. When the input code matches the preset code, the locked state of the smart device is deactivated at step S1130, and the smart device enters a system update mode at step S1150 and performs a task for deleting the root binary and the custom kernel at step S1160.

In contrast, when the input code does not match the preset code, the smart device is continuously maintained in a locked state at step S1140.

FIG. 12 illustrates a method for unlocking a locked smart device using a scheme for connecting the smart device, maintained in the locked state, to a PC.

Referring to FIG. 12, the smart device is connected to the PC at step S1210, and then accesses an unlocking server at step S1220.

Here, a user' identity is verified via an authentication procedure at step S1230, and the locked state of the smart device is deactivated only when the user's identity has been successfully verified at step S1240. The smart device enters a system update mode at step S1250, and deletes the root binary and the custom kernel at step S1260.

When the verification of the user's identity fails, the smart device is maintained in the locked state at step S1270.

In conventionally provided methods, such as pattern-lock, password input, and fingerprint recognition, user access control functions are uploaded to memory after a kernel has been executed, and thus data may be freely acquired by bypassing an access control function. However, when the present invention is used, the smart device makes a transition to the state in which no operations except for an operation of unlocking the smart device are performed at the bootloader step, and thus data cannot be acquired using only existing forensic data extraction methods.

Further, since only an authenticated user may unlock a locked smart device, problems, such as the loss of the smart device, data theft by a third party, and the deletion of user data attributable to factory reset using a kill switch, may be solved.

As described above, the present invention is configured to detect unauthorized activity at a bootloader step, and when unauthorized activity occurs, perform an operation of locking the smart device at the bootloader step, thus fundamentally blocking access to data to be activated after the bootloader step.

Further, the present invention may protect data stored in flash memory even if communication is interrupted, thus fundamentally blocking access to data even if communication is interrupted due to the removal of a USIM card or chip, the activation of an airplane mode, etc.

As described above, in the data protection apparatus and method for a smart device according to the present invention, the configurations and schemes in the above-described embodiments are not limitedly applied, and some or all of the above embodiments can be selectively combined and configured so that various modifications are possible.

What is claimed is:

1. A data protection apparatus for a smart device, comprising:
    a detection unit for detecting unauthorized activity in a bootloader of the smart device, based on whether a program for acquiring an administrator privilege has been installed and whether a compressed-command file is present, during a procedure for loading the bootloader; and
    a data access blocking unit for, when the unauthorized activity is detected, performing an operation of locking the smart device, thus blocking access to data in the smart device,
    wherein the detection unit performs a task for detecting the unauthorized activity before any one of a boot image and a recovery image present in the smart device is uploaded to memory,
    wherein the detection unit detects the unauthorized activity based on whether an original kernel present in the boot image or the recovery image has been replaced with a custom kernel,
    wherein the compressed-command file contains root binary codes,
    wherein the data access blocking unit switches the smart device to a locked state when the unauthorized activity is detected,
    wherein the data access blocking unit switches modules other than only modules that are only capable of responding to an unlock command to a deactivated state when the smart device is in the locked state,
    wherein the only modules that are only capable of responding to an unlock command are a Universal Serial Bus (USB) module and the bootloader of the smart device,
    wherein one of the modules that switched to the deactivated state is a firmware update module to prevent the bootloader from being replaced via a firmware update when the smart device is in the locked state,
    wherein the smart device further comprising a data access unblocking unit for releasing the locked state of the smart device,
    wherein the data access unblocking unit establishes a connection between the smart device and a computer using the USB module, and the computer releases the locked state based on data received from an unlocking server when the user authentication is performed while the smart device and the computer are connected and the computer and the unlocking server are connected, and
    wherein when the locked state is released, the program for acquiring the administrator privilege and the custom kernel are deleted using the firmware update module.

2. The data protection apparatus of claim 1, wherein the detection unit detects the unauthorized activity based on a result of comparing a hash value of the original kernel with a hash value of the custom kernel.

3. The data protection apparatus of claim 2, wherein the detection unit detects the unauthorized activity whenever the smart device is booted.

4. A data protection method for a smart device, comprising:
- detecting unauthorized activity in a bootloader of the smart device, based on whether a program for acquiring an administrator privilege has been installed and whether a file in which commands are compressed is present, during a procedure for loading the bootloader; and
- when the unauthorized activity is detected, performing an operation of locking the smart device and blocking access to data in the smart device,
- wherein detecting the unauthorized activity is configured to detect the unauthorized activity before any one of a boot image and a recovery image present in the smart device is uploaded to memory,
- wherein the detecting the unauthorized activity detects the unauthorized activity based on whether an original kernel present in the boot image or the recovery image has been replaced with a custom kernel,
- wherein the compressed-command file contains root binary codes,
- wherein the data protection method further comprising switching the smart device to a locked state when the unauthorized activity is detected, and switching modules other than only modules that are only capable of responding to an unlock command to a deactivated state when the smart device is in the locked state,
- wherein the only modules that are only capable of responding to an unlock command are a Universal Serial Bus (USB) module and the bootloader of the smart device,
- wherein one of the modules that switched to the deactivated state is a firmware update module to prevent the bootloader from being replaced via a firmware update when the smart device is in the locked state,
- wherein the data protection method further comprising establishing a connection between the smart device and a computer using the USB module, and the computer releases the locked state based on data received from an unlocking server when the user authentication is performed while the smart device and the computer are connected and the computer and the unlocking server are connected, and releasing the locked state of the smart device, and
- wherein when the locked state is released, the program for acquiring the administrator privilege and the custom kernel are deleted using the firmware update module.

5. The data protection method of claim 4, wherein detecting the unauthorized activity is configured to detect the unauthorized activity based on a result of comparing a hash value of the original kernel with a hash value of the custom kernel.

6. The data protection method of claim 5, wherein detecting the unauthorized activity is configured to detect the unauthorized activity whenever the smart device is booted.

\* \* \* \* \*